Nov. 1, 1938.　　　　J. C. W. MATHIAS　　　2,135,087
ALIGNER AND HOLDER FOR SCREW SPIKING MACHINES
Filed Dec. 31, 1936　　　6 Sheets-Sheet 1
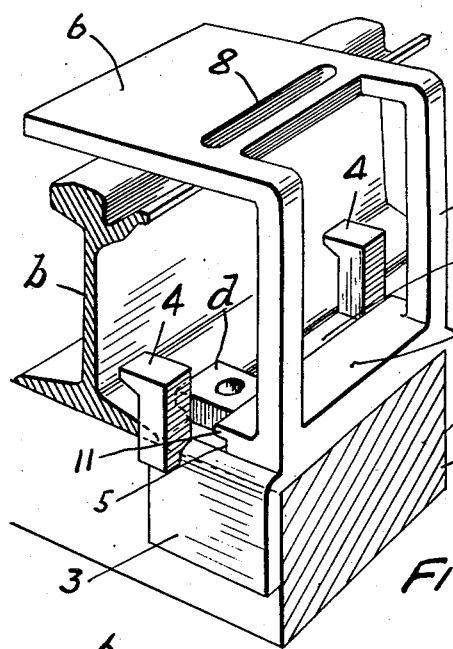
FIG.3.
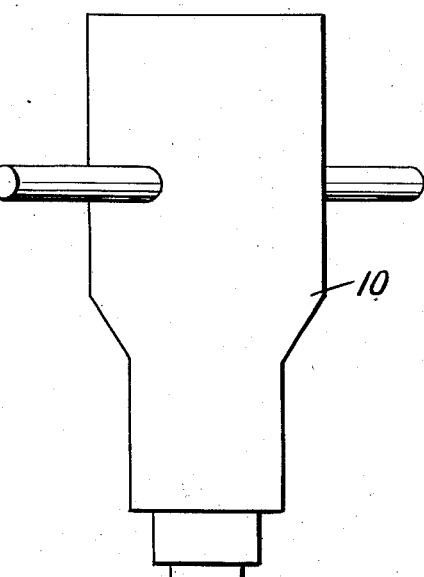
FIG.1.
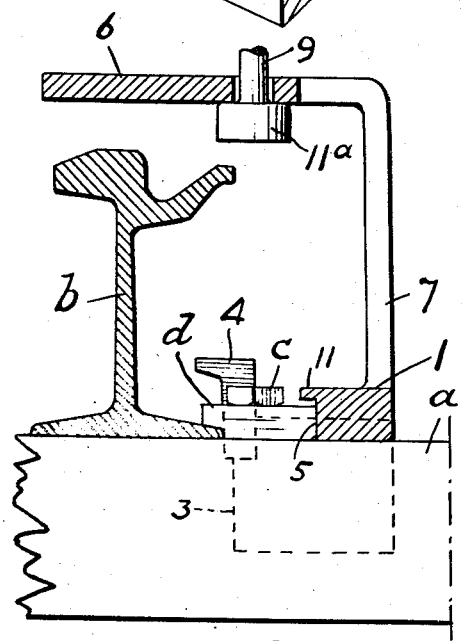
FIG.2.
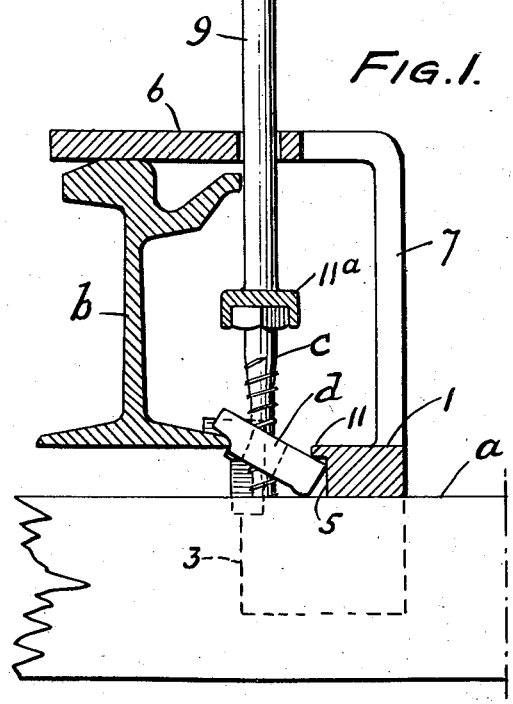
WITNESS:
INVENTOR
John C. W. Mathias
BY
Augustus B. Stoughton.
ATTORNEY.

Nov. 1, 1938.   J. C. W. MATHIAS   2,135,087
ALIGNER AND HOLDER FOR SCREW SPIKING MACHINES
Filed Dec. 31, 1936   6 Sheets-Sheet 2

WITNESS:

INVENTOR
John C. W. Mathias
BY
Augustus B. Staughton.
ATTORNEY.

Nov. 1, 1938.   J. C. W. MATHIAS   2,135,087
ALIGNER AND HOLDER FOR SCREW SPIKING MACHINES
Filed Dec. 31, 1936   6 Sheets-Sheet 3

WITNESS:
Rob't R. Mitchel

INVENTOR
John C. W. Mathias
BY
Augustus B. Stoughton
ATTORNEY.

Nov. 1, 1938.    J. C. W. MATHIAS    2,135,087
ALIGNER AND HOLDER FOR SCREW SPIKING MACHINES
Filed Dec. 31, 1936    6 Sheets-Sheet 4

WITNESS:

INVENTOR
John C. W. Mathias
Augustus B. Stoughton.
ATTORNEY.

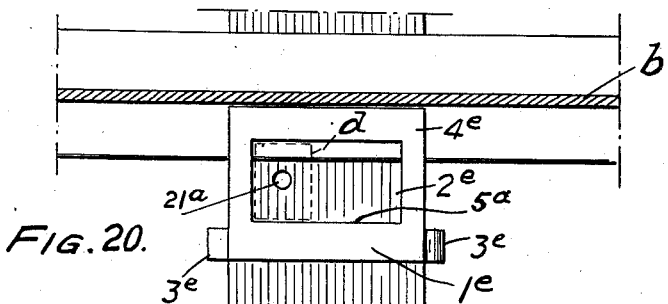
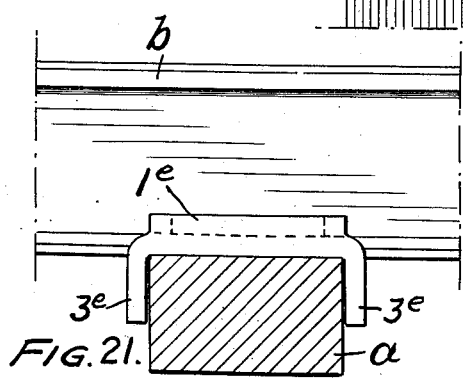
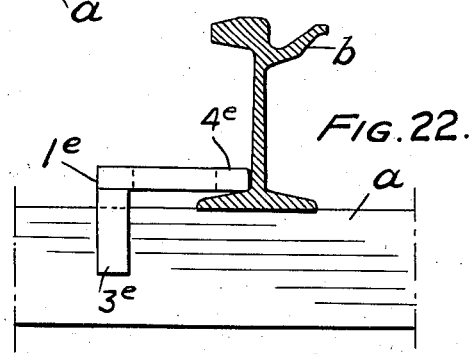
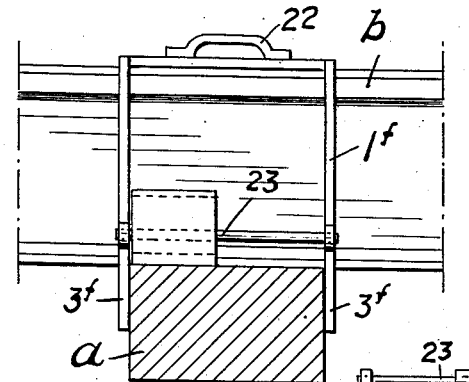
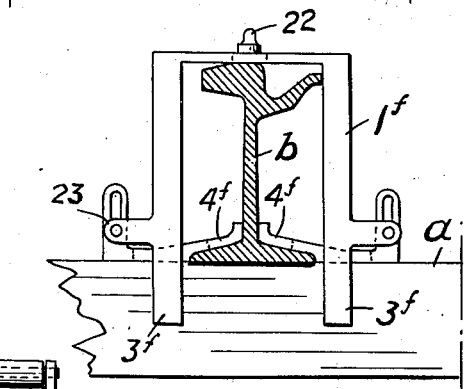
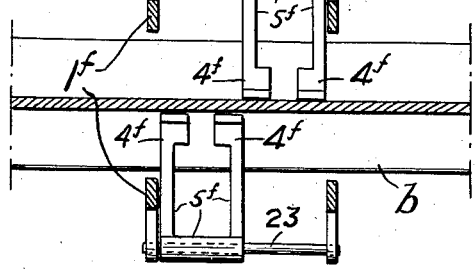

Patented Nov. 1, 1938

2,135,087

UNITED STATES PATENT OFFICE 2,135,087

ALIGNER AND HOLDER FOR SCREW SPIKING MACHINES

John C. W. Mathias, Upper Darby, Pa.

Application December 31, 1936, Serial No. 118,469

7 Claims. (Cl. 104—2)

In the construction and repair of tracks, including trolley car tracks, by means of screw spiking machines it is customary to dig out the road-bed under the rails so that the ties are spaced below the foot of the rails, and the clips are brought to bear on the foot of a rail and on the top face of the tie as the latter is drawn up into contact with the underside of the foot of the rail by the screw spike as it is driven into the tie by the machine. The rotation of the screw spike has a tendency to put the clip and tie out of alignment with respect to the rail and in the operation considerable expense is employed because of the fact that five men are customarily employed.

Objects of the present invention are to provide a tie and clip aligner and holder for use with screw spiking machines and by the use of which the expense is reduced because the service of the two men can be dispensed with and for other reasons which will hereinafter appear.

Other objects of the invention will appear from the following description at the end of which the invention will be claimed.

Generally stated the invention comprises a tie and clip aligner and holder having intermediate of its ends an opening adapted for the accommodation of clips and for the passage of a screw spike, the holder having means seatable on the tie and having an arm adapted to engage the foot of the rail, and the opening defining a wall for holding the clip.

The invention further consists in the improvements to be presently described and finally claimed.

In the following description reference will be made to the accompanying drawings forming part hereof and in which, Figure 1 is a view partly in section in the plane of a tie and illustrating a holder and aligner embodying features of the invention and showing the position of the parts prior to driving the screw spike.

Figure 2 is a similar view illustrating the positions of the parts after the screw spike has been driven and before the holder and aligner has been removed.

Figure 3 is a perspective view of the holder and aligner from which the stem for driving the spike has been omitted for the sake of clearness.

Figure 20 is a top or plan view partly in section illustrating another modification of the holder and aligner showing a clip in dotted lines.

Figure 21 is an elevational view partly in section of the end of the holder and aligner shown toward the bottom of the sheet in Figure 20.

Figure 22 is a sectional view taken on a vertical plane in Figure 20; and

Figure 4:
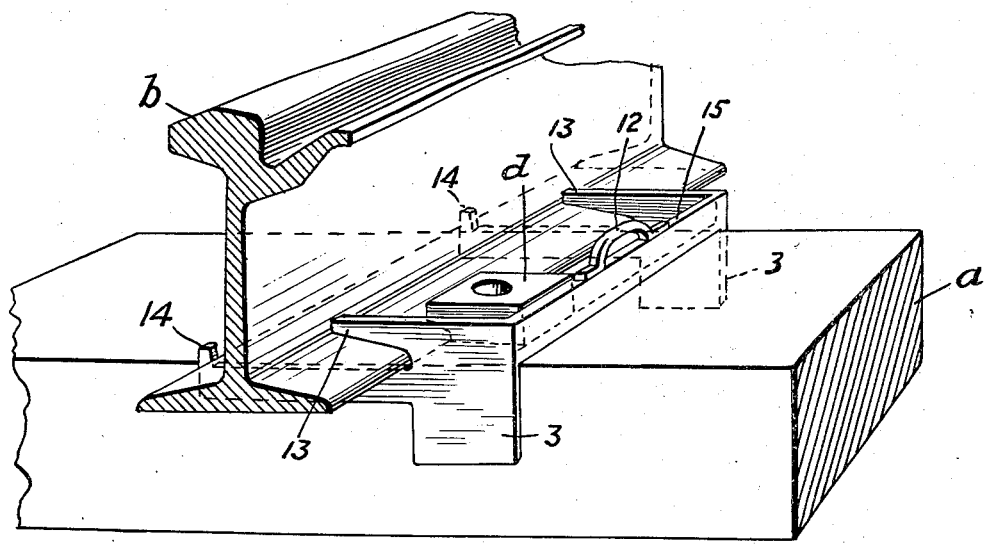
Figure 4 is a perspective view illustrating a holder and aligner embodying a modification of the invention and which is not intended for attachment to the spike driving mechanism.

Figures 23, 24, and 25 are respectively side, end and plan views partly in section illustrating another modification intended for use in connection with screw spikes disposed on opposite sides of the rail.

Referring to the drawings, and more particularly to Figs. 1, 2 and 3, the holder and aligner 1 is provided intermediate of its ends with an opening 2. The holder is also provided with a pair of legs 3 spaced to engage and straddle a tie $a$ and the holder is also provided with a pair of arms 4 for engaging the foot of the rail $b$. The opening 2 defines a wall 5 for holding the clip. The operative faces of the legs 3 that engage the tie and the operative faces of the arms 4 that engage the foot of the rail are disposed in right angular relation. The arms 4 extend upward so as to permit the holder to occupy the positions shown in Figs. 1 and 2. The holder is provided with a head 6 spaced from and carried parallel to it by a post 7. There is in the head a slot 8 shown as elongated and through the slot passes the spindle 9 of the screw spike driving mechanism 10. The head 11a of the spindle engages the head of the screw spike $c$ and it is too large to pass through the slot 8. The holder and the driving mechanism are, therefore, portable as a unit. The driving mechanism 10 may include an electric motor or other means for rotating the spindle 9.

In use and referring to Figure 1 the tie $a$ is spaced below the rail $b$. The clip $d$ is positioned as shown in Figure 1 with the screw spike $c$ passing through the opening in the clip and entering a hole previously provided in the tie. The heel of the clip $d$ underlies a lip 11 provided on the holder 1. The spike is then driven by rotating it and the parts assume the position shown in Figure 2. However, the legs 3 and the arms 4 operate to keep the rail and tie in right angular relation in opposition to the torque set up by the revolving screw spike as it enters the tie, and the wall 5 holds or squares the clip $d$ with respect to the edge of the rail foot.

It may be remarked that the hole in the clip $d$ shown in dotted lines in Figure 1 is large enough to provide sufficient clearance between its wall and the surface of the screw spike $c$ to permit the clip as it is raised at its lower right hand corner by the lifting of the tie to move from the position shown in Figure 1 to the position shown in Figure 2. During this rising motion of the tie the lower right hand corner of the clip slides along the surface of the tie toward the right while the usual left hand undercut end of the clip slides and turns about the right hand edge of the foot of the rail. The part 1 and other parts which it carries including the lip 11 also rise. It may be further remarked that there is provided in the construction sufficient tolerance to enable the parts to function in the manner shown in Figs. 1 and 2, without the clip tending to push the part 1 toward the right far enough to cause any substantial displacement of the arms 4 in respect to the right-hand edge of the foot of the rail. Of course the spike is vertically fixed but the clip is afforded, for example, by reason of the size of the hole in it, some endwise movement in respect to the spike as the right-hand lower corner of the clip is raised by the tie as the tie is drawn up to the foot of the rail carrying with it the part 1 and all the parts which are carried by the part 1. There is nothing especially new in the clip per se.

Thus the tie and rail are properly aligned or held in aligned position and the clip is squared or held square with the foot of the rail notwithstanding the rotation of the spike and the drawing up of the tie to the foot of the rail.

Obviously two men may be engaged in transporting the spike driving mechanism 10 while another man can put the clips into the holder and the spikes into the holes already prepared for them in the tie. The elongated wall 5 and slot 8 permit the clip or even a pair of clips and the spike or pair of spikes to be properly positioned in respect to the holes in the tie. The head 6 not only serves to connect the holder and driving mechanism 10 so that they may be carried about as a unit but also by resting on the top of the rail (Figure 1) serves to position the holder while the clip and spike are arranged in position as indicated in that figure.

The construction and mode of operation of the device shown in Figure 4 are substantially as above described except as follows:—The holder is not connected with the spike driving mechanism but instead is provided with a handle 12. The holder is also provided with two pairs of arms 13 and 14 of which the arms 14 engage the far side of the rail foot and the arms 13 engage the near side of the rail foot. The wall for positioning the clip $d$ is indicated at 15. It will, of course, be understood that when the holder is applied to the rail foot the tie $a$ is depressed and spaced from the bottom of the rail.

Figures 5, 6, 7:
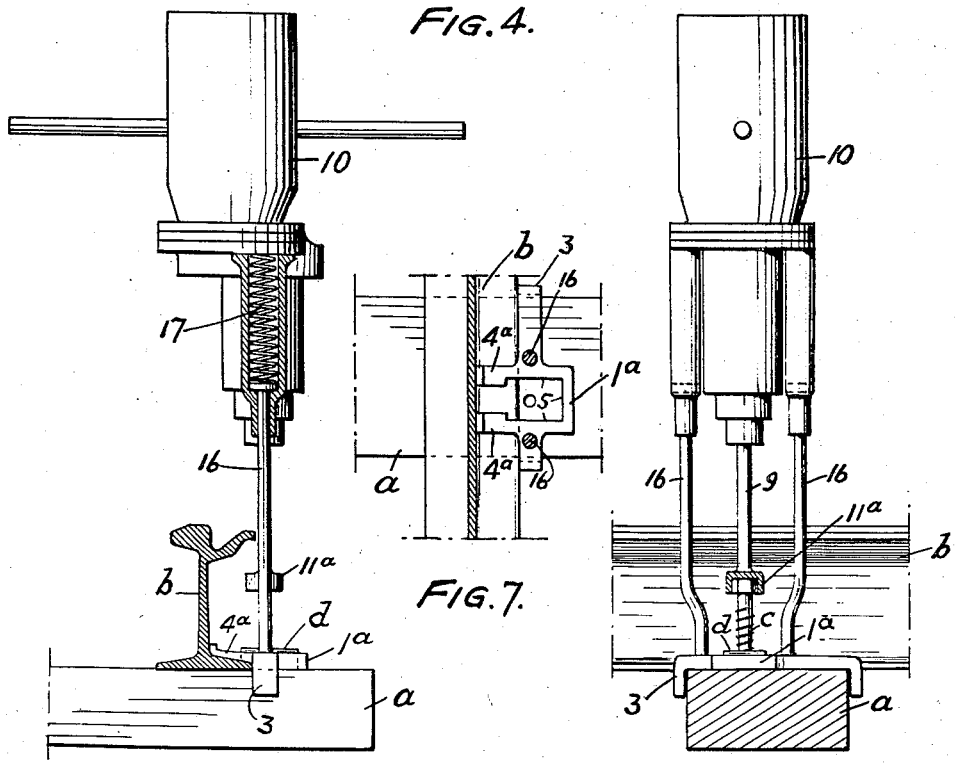
Figure 5 is an elevational view showing the tie in section and illustrating a modification of the holder and aligner which is attached to the spike driving mechanism.
Figure 6 is a sectional view taken at right angles to the plane of Figure 5.
Figure 7 is a top or plan view partly in section with the clip omitted.
Figure 10:
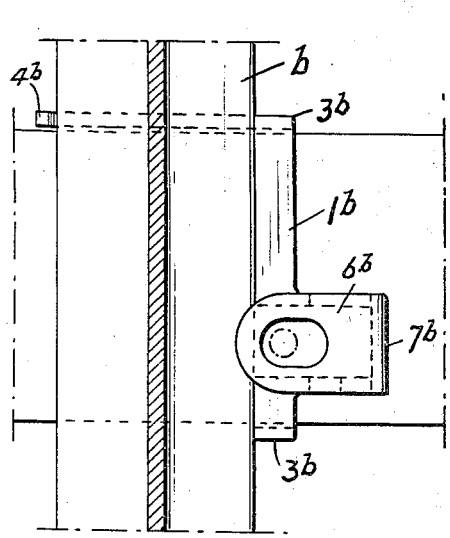
Figure 10 is a top or plan view of Figure 8 partly in section and with the clip omitted.
Figure 11:
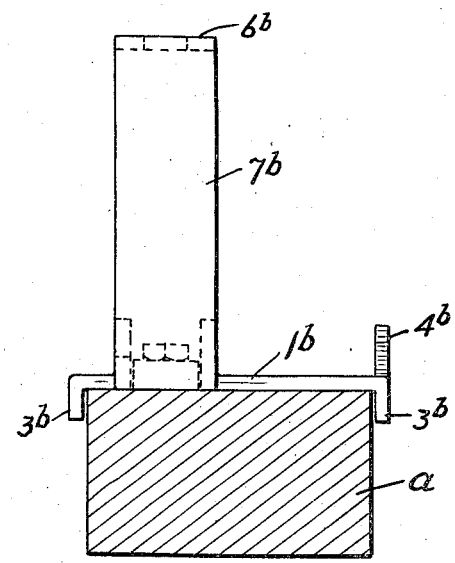
Figure 11 is an elevational view partly in section looking at Figure 10 from right to left.
Figure 8:
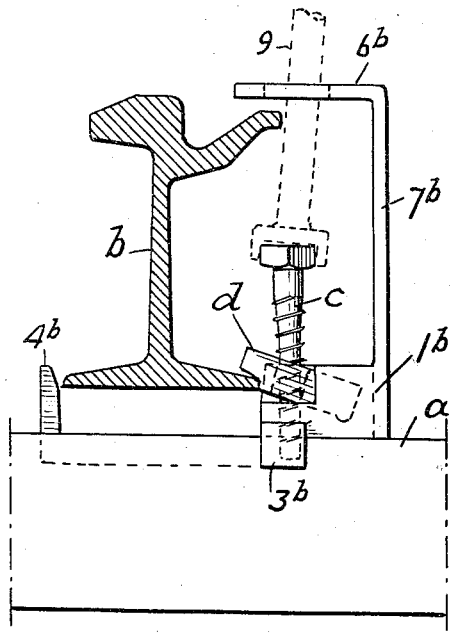
Figure 8 is a view partly in section transverse of the rail and partly in elevation illustrating a modification of the holder and aligner intended to be a part of the spike driving mechanism.
Figure 9:
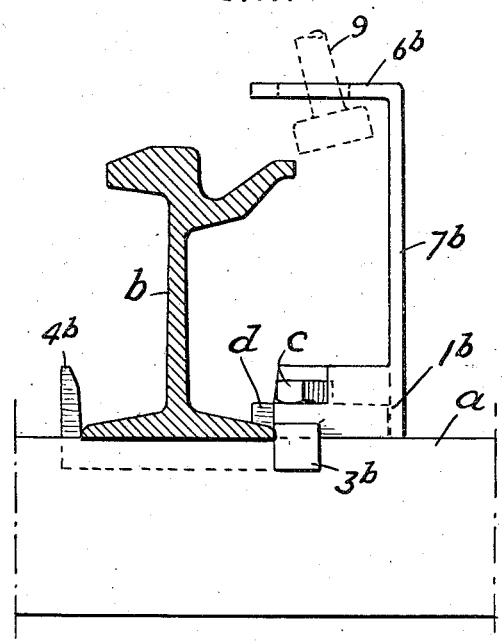
Figure 9 is a similar view showing the parts in position after the spike has been driven.
Figure 14:
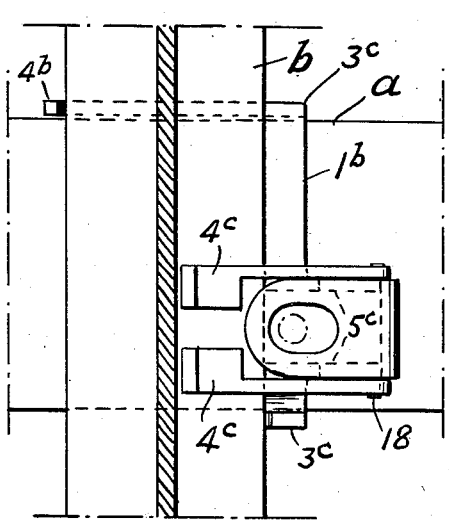
Figure 14 is a top or plan view, with the rail in section, of Figure 12.
Figure 15:
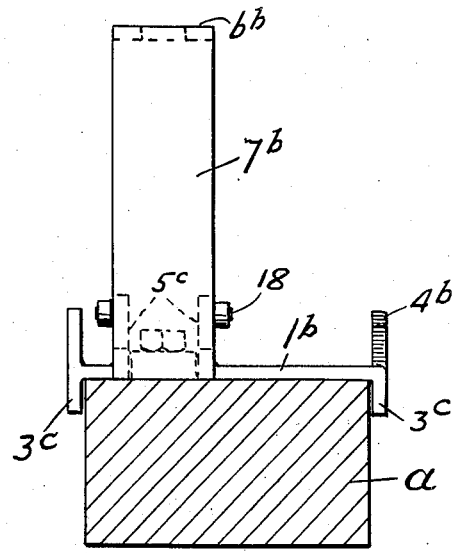
Figure 15 is an elevational view of the right-hand end of the device shown in Figure 14.
Figure 12:
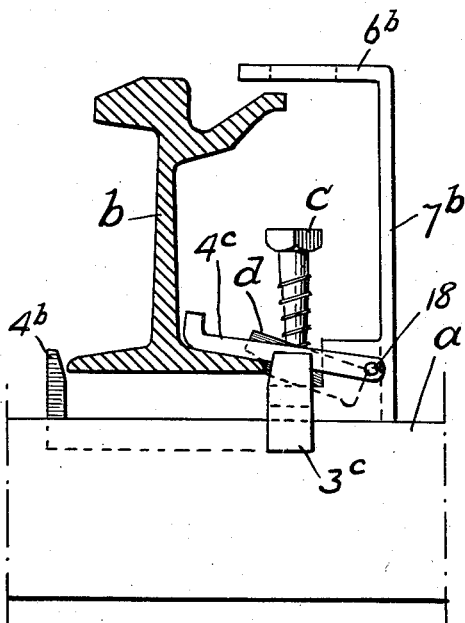
Figure 12 is a view taken in the direction of the rail and illustrating a modification in which the arms which engage the rail and carry the clip are pivoted; the holder and aligner being adapted for connection with the spike driving mechanism so as to be portable therewith as a unit.
Figure 13:
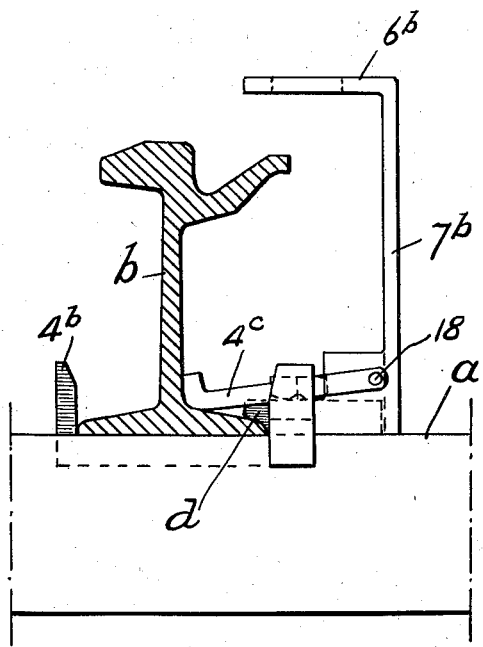
Figure 13 is a view similar to Figure 12 showing the positions of the parts after the spike is driven.
Figure 18:
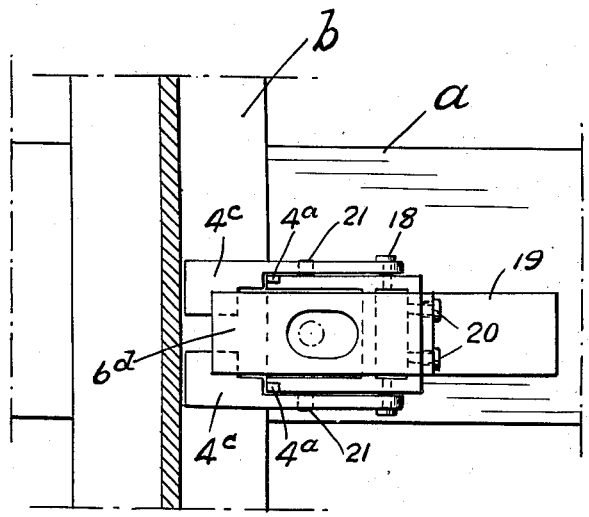
Figure 18 is a top or plan view of Figure 16 with the rail in section.
Figure 19:
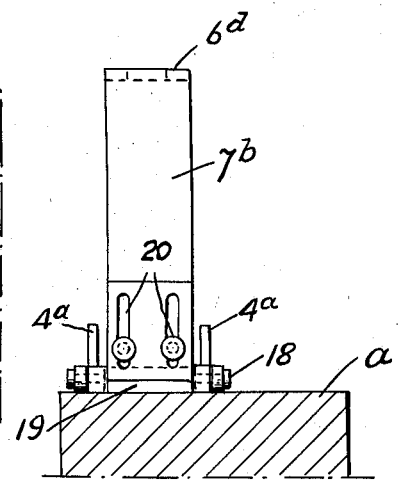
Figure 19 is an end view of Figure 18.

The construction and mode of operation of the modification shown in Figs. 5, 6 and 7 are as above described except as follows:—

The spike driving mechanism 10 is provided with standards 16 which are spring-pressed at their upper ends and are connected at their lower ends with the holder 1a. The holder 1a is provided with arms 4a and with feet 3 which straddle the tie $a$ and in association with the arms 4a keep the tie and clip square with the rail notwithstanding the torque exerted by the screw spike. The springs 17 permit the spike driving mechanism 10 to advance its spindle as the spike raises the tie into position and enters the tie. Again the pressure of the springs frictionally engage the tie and tend to keep it in place.

The construction and mode of operation of the modification shown in Figs. 8 to 11, inclusive, are as above described except as follows: The holder 1b is provided with an arm 4b which passes under the foot of the rail and engages with the far edge thereof. The legs 3b are present as before. The head 6b does not extend across the rail all the way. The clip $d$ may, in the first instance and before the tie is drawn up to the rail, be supported by the screw and by the foot of the rail, the screw serving to support it because it is tipped so that the edges of the hole in it engage the screw.

The modification shown in Figs. 12 to 15, inclusive, is constructed and operated in the manner as described except as follows: Inasmuch as certain elements in these figures correspond with elements in Figs. 8 to 11, they are given the same reference characters. However, the arms 4c, which provide the opening that defines the wall 5c which guides the clip, are pivoted at 18 so that they may readily assume the position shown in Fig. 13 and may swing into the position shown in Fig. 12, guiding the clip $d$ as they do so.

Figure 16:
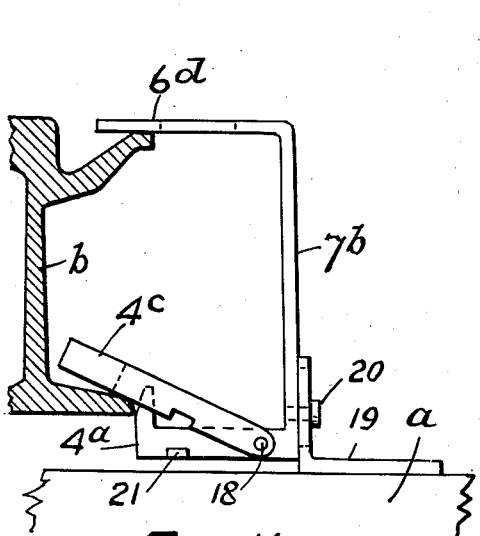
Figure 16 is a view similar to Figure 12 illustrating a modification in which there is a slidable foot for engaging the tie, the holder and aligner being adapted for attachment to spike driving mechanism omitted for the sake of clearness.
Figure 17:
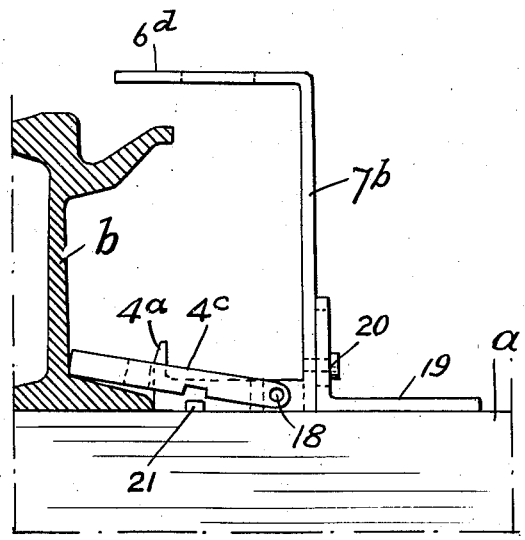
Figure 17 is a view similar to Figure 16 showing the positions of the parts after the spike has been driven.

The construction and mode of operation of the modification shown in Figs. 16 to 19 are as above described except as follows: There is on the back of the post 7b a foot 19 which is slidably mounted by means of the slot and pin connections 20. This foot may drop to the level of the tie as shown in Fig. 16, while the head 6d rests on the top of the rail. The arms 4c are pivotally mounted and their turning in downward direction is limited by the stop 2f. To prevent relative turning movement of the holder in respect to the tie and rail, the operator may put his foot on the foot 19; the holder, being comparatively narrow, can then be shifted crosswise of the tie (Fig. 19) so as to locate the spike in the hole previously made in the tie. After the spike has been inserted in the hole previously provided in the tie, the spike and the arms 4c are disposed at the points of a triangle, and they therefore oppose turning movement of the holder in respect to the rail.

The construction and mode of operation of the modification shown in Figs. 20, 21 and 22 are as above described except as follows: The holder 1e is provided with legs 3e which straddle the tie a and also with arms 4e which engage the bottom portion of the rail. The arms are connected, defining the opening 2e and providing the wall 5a which aligns the clip shown in dotted lines. The circle 21a indicates the hole in the tie provided for the reception of the spike in order to start the spike into the tie. The opening 2e is wide enough to permit the clip to be adjusted crosswise of the tie to align it with the hole provided in the tie. In this case, the screw spike holds the clip d in position until the tie is drawn up to the bottom of the rail.

The construction and mode of operation of the modification illustrated in Figs. 23 to 25 are as above described except that the device is intended for application to the rail in such a way that it serves with screw spikes on opposite sides of the rail. The holder 1f takes the form of a bridge structure provided at its top with a handle 22. The legs 3f straddle the tie and are continuations of the bridge structure. The arms 4f are pivoted by means of slotted ears 23, so that they have two motions: one up-and-down to accommodate the drawing together of the tie and rail; and the other a turning motion to permit the device to be put down over the rail onto the tie. In this case, the holders can be adjusted along the pins 23 into any desired position crosswise of the tie.

It may be remarked that the clip is held in position by one or more walls of the opening so that, after the spike has been inserted through the clip and into the hole prepared for it in the tie and then rotated, the clip is held against rotation or rotary movement and remains properly aligned with respect to the rail. Furthermore, the holder as a whole is held against rotary motion by the arms with which it is provided and which bear on the foot of the rail, being further held either by the legs which straddle the tie, or by the spring-pressure as in Figs. 5 and 6, or the three-point disposition of the arms and the screw spike as in Figs. 14 to 19; or, in general, the holder is seated on the tie. In cases where the legs that straddle the tie are employed, the tie is also held against any tendency to rotary motion or movement.

From the foregoing description, it is evident that modifications may be made without departing from the spirit of the invention which is not limited as to matters of mere form and arrangement or otherwise than as the prior art and the appended claims may require.

I claim:—

1. For use in assembling rails, ties, clips and screw spikes by means of a screw spiking machine; a jig or fixture adapted to fixedly seat on a tie and having leg and arm members of which the operative faces are disposed at right angles in respect to each other and respectively adapted to engage a tie and a rail and hold the same in fixed angular relation against the torque of a screw spike driven by the machine, and said jig or fixture having intermediate of its ends an opening adapted to accommodate a perforate clip and defining a wall angularly fixed in respect to the rail and adapted to cooperate with an edge wall of the clip to square the clip in respect to the rail, said opening and the perforation in the clip permitting of the passage of a screw spike into the tie to draw the tie and clip and jig or fixture upwards in respect to the rail, the perforation in the clip being large enough to permit the clip when the tie is spaced from the foot of the rail to occupy an inclined position with one undercut end on the foot of the rail and free to slide and turn thereon and with a part of the other end confronting the wall in the opening and with the other part of that end free to slide and turn on the face of the tie as the latter is drawn up to the rail, thereby putting the clip in horizontal position.

2. For use in assembling rails, ties, clips and screw spikes by means of a screw spiking machine; a jig or fixture adapted to seat on a tie and having means of which the operative faces are disposed at right angles in respect to each other and respectively adapted to engage a tie and a rail and hold the same in fixed angular relation against the torque of a screw spike driven by the machine, and said jig or fixture having intermediate of its ends an opening adapted to accommodate a perforate clip and defining a wall angularly fixed in respect to the rail and adapted to cooperate with an edge wall of the clip to square the clip in respect to the rail, there being clearance provided between the clip and other parts with which it engages sufficient to permit of the passage of a screw spike into the tie to draw the tie and clip and jig or fixture upwards in respect to the rail, and sufficient to permit the clip when the tie is spaced from the foot of the rail to occupy an inclined position with one end on the foot of the rail and with the other end confronting the wall in the opening and free to slide and turn on the face of the tie as the latter is drawn up to the rail, thereby putting the clip in horizontal position.

3. For use in assembling rails, ties, clips and screw spikes by means of a screw spiking machine; a jig or fixture adapted to seat on a tie and having a pair of spaced legs and arms of which the operative faces are disposed at right angles in respect to each other and respectively adapted to engage a tie and a rail and hold the same in fixed angular relation against the torque of a screw spike driven by the machine, and said jig or fixture having intermediate of its ends an opening adapted to accommodate a perforate clip and defining a wall angularly fixed in respect to the rail and adapted to cooperate with an edge wall of the clip to square the clip in respect to the rail, there being clearance provided between the clip and other parts with which it engages sufficient to permit of the passage of a screw spike into the tie to draw the tie and clip and jig or fixture upwards in respect to the rail and sufficient to permit the clip when the tie is spaced from the foot of the rail to occupy an inclined position with one end on the foot of the rail and with a part of the other end confronting the wall in the opening and with the other part of that end free to slide and turn on the face of the tie as the latter is drawn up to the rail, thereby putting the clip in horizontal position.

4. For use in assembling rails, ties, clips and screw spikes by means of a screw spiking machine; a jig or fixture adapted to seat on a tie and having a pair of spaced legs and pivotal arms of which the operative faces are disposed at right angles in respect to each other and respectively adapted to engage a tie and a rail and hold the same in fixed angular relation against the torque of a screw spike driven by the machine, and said jig or fixture having intermediate of its ends an opening adapted to accommodate a perforate clip and defining a wall angularly fixed in respect to the rail and adapted to cooperate with an edge wall of the clip to square the clip in respect to the rail, there being clearance provided between the clip and other parts with which it engages sufficient to permit of the passage of a screw spike into the tie to draw the tie and clip upwards in respect to the rail, and sufficient to permit the clip when the tie is spaced from the foot of the rail to occupy an inclined position with one end on the foot of the rail and with a part of the other end confronting the wall in the opening and with the other part of that end free to slide and turn on the face of the tie as the latter is drawn up to the rail, thereby putting the clip in horizontal position.

5. For use in assembling rails, ties, clips and screw spikes by means of a screw spiking machine; a jig or fixture adapted to seat on a tie and having a pair of spaced legs and arms of which the operative faces are disposed at right angles to each other and respectively adapted to straddle the tie and engage the rail flange and hold the same in fixed angular relation against the torque of a screw spike driven by the machine, and said jig or fixture having intermediate of its ends an opening adapted to accommodate a perforate clip and defining a wall angularly fixed in respect to the rail and adapted to cooperate with an edge wall of the clip to square the clip in respect to the rail, there being clearance provided between the clip and other parts with which it engages sufficient to permit of the passage of a screw spike into the tie to draw the tie and clip up to the rail, and sufficient to permit of the clip when the tie is spaced from the foot of the rail to occupy an inclined position with one end on the foot of the rail and with a part of the other end confronting the wall in the opening and with the other part of that end free to slide and turn on the face of the tie as the latter is drawn up to the rail, thereby putting the clip in horizontal position.

6. For use in assembling rails, ties, clips and screw spikes by means of a screw spiking machine; a jig or fixture adapted to seat on a tie and having means of which the operative faces are disposed at right angles in respect to each other and respectively adapted to engage a tie and a rail and hold the same in fixed angular relation against the torque of a screw spike driven by the machine, and said jig or fixture having intermediate of its ends an opening adapted to accommodate a perforate clip and defining a wall angularly fixed in respect to the rail and adapted to cooperate with an edge wall of the clip to square the clip in respect to the rail, there being clearance provided between the clip and other parts with which it engages sufficient to permit of the passage of a screw spike into the tie to draw the tie and clip and jig or fixture upwards in respect to the rail, and sufficient to permit of the clip when the tie is spaced from the foot of the rail to occupy an inclined position with one end on the foot of the rail and with the other end confronting the wall in the opening and that end free to slide and turn on the face of the tie as the latter is drawn up to the rail, thereby putting the clip in horizontal position, and means interposed between and connecting the jig or fixture and said machine to make them portable as a unit.

7. For use in assembling rails, ties, clips and screw spikes by means of a screw spiking machine; a jig or fixture adapted to seat on a tie and having means of which the operative faces are disposed at right angles in respect to each other and respectively adapted to engage a tie and a rail and hold the same in fixed angular relation against the torque of a screw spike driven by the machine, and said jig or fixture having intermediate of its ends an opening adapted to accommodate a perforate clip and defining a wall angularly fixed in respect to the rail and adapted to cooperate with an edge wall of the clip to square the clip in respect to the rail, there being clearance between the clip and other parts with which it engages sufficient to permit of the passage of a screw spike into the tie to draw the tie and clip and jig or fixture upwards in respect to the rail, and sufficient to permit of the clip when the tie is spaced from the foot of the rail to occupy an inclined position with one end on the foot of the rail and with a part of the other end confronting the wall in the opening and with the other part of that end free to slide and turn on the face of the tie as the latter is drawn up to the rail, thereby putting the clip in horizontal position, and spring pressed standards interposed between and connecting the jig or fixture and the machine to make them portable as a unit.

JOHN C. W. MATHIAS.